United States Patent
Little

(10) Patent No.: US 6,292,486 B1
(45) Date of Patent: Sep. 18, 2001

(54) LOW COST ISDN/POTS SERVICE USING ATM

(75) Inventor: Vernon Robert Little, Belcarra (CA)

(73) Assignee: PMC-Sierra Ltd., Burnaby (CA)

( * ) Notice: Subject to any disclaimer, the term of this patent is extended or adjusted under 35 U.S.C. 154(b) by 0 days.

(21) Appl. No.: 08/516,216

(22) Filed: Aug. 17, 1995

(51) Int. Cl.[7] .................................................. H04L 12/56
(52) U.S. Cl. ........................................... 370/395; 370/439
(58) Field of Search ......................... 370/60, 60.1, 110.1, 370/112, 94.1, 94.2, 94.3; 359/136, 137, 123

(56) References Cited

U.S. PATENT DOCUMENTS

| | | | |
|---|---|---|---|
| 4,970,721 | * 11/1990 | Aczel et al. | 370/92 |
| 5,265,096 | * 11/1993 | Parruck | 370/110.1 |
| 5,387,927 | * 2/1995 | Look et al. | 348/6 |
| 5,398,129 | * 3/1995 | Reimann | 359/137 |
| 5,544,161 | * 8/1996 | Bigham et al. | 370/58.1 |
| 5,544,164 | * 8/1996 | Baran | 370/60.1 |
| 5,568,486 | * 10/1996 | Huscroft et al. | 370/94.2 |

OTHER PUBLICATIONS

G.–H Im, et al., "51.84 Mb/s 16–CAP ATM LAN Standard". IEEE, May 1995.*

Lee Goldberg, "A Blend of LAN and VAN Technologies Yields A Low–Cost Chip Set Which Delivers Video, Telephony and High–Rate ATM over Twisted–Pair Copper Telephone Lines", Electronic Design/Oct. 1995.*

* cited by examiner

*Primary Examiner*—Hassan Kizou
(74) *Attorney, Agent, or Firm*—Shapiro Cohen

(57) ABSTRACT

A method of providing broadband communication services to a subscriber comprised of providing first broadband services from a central office via an ATM link to a neighborhood pedestal system, providing time division multiplex (TDM) services including voice communication services from the central office via a TDM link to the neighborhood pedestal system, providing a SONET-ATM communication link from the neighborhood pedestal system over two unshielded pair of twisted wires to a user-to-network interface (UNI) at a subscriber location, and providing ATM services over the SONET-ATM communication link and providing integrated services digital network (ISDN) or voice services within a SONET-ATM data frame using timing of the SONET-ATM communication link, to the UNI, whereby ATM, ISDN and voice services are provided between the neighborhood pedestal system and the subscriber location over the unshielded wires.

5 Claims, 5 Drawing Sheets

LOW COST ISDN/POTS SERVICE USING ATM

FIELD OF THE INVENTION

Figure 1:
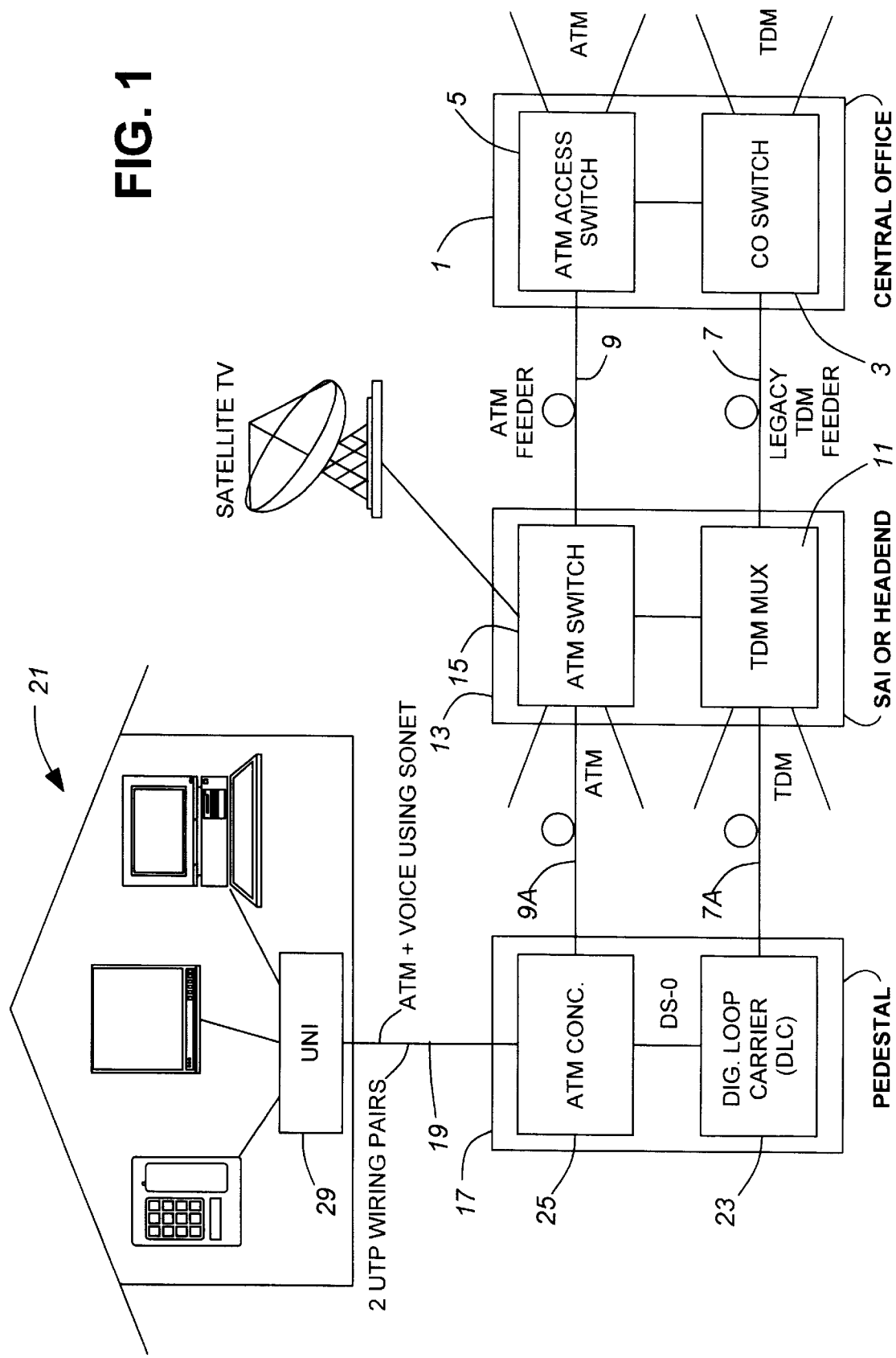

This invention relates to communication systems and in particular to a method and apparatus for providing asynchronous transfer mode (ATM) signals, integrated circuit digital network (ISDN) signals and voice signals to a subscriber using unshielded twisted pair wires.

BACKGROUND TO THE INVENTION

Asynchronous transfer mode (ATM) transmission systems which carry voice and other forms of isochronous data requires the use of complex and expensive ATM adaptation layer type 1 (AAL-1) segmentation and reassembly processors. This requires that the two ends of a transmission path should communicate timing information so that they can recover from network-induced delays and delay variance in the transmission path. This requires the use of complex digital phase-locked loops and protocols that have not been fully finalized or proven, or proprietary systems.

In addition, AAL-1 is not compatible with billions of dollars worth of installed telephone networking equipment and cannot be deployed without massive and expensive network changes.

For short transmission distances, such as between a subdivision pedestal and a home, or between a PBX and a desk, these complex and expensive protocols are uneconomical compared to existing wire-line solutions that use non-ATM techniques.

SUMMARY OF THE INVENTION

The present invention provides a method and means for re-using the existing unshielded wire pairs between the pedestal and a home, or between a PBX and a desk, while preserving the legacy voice or ISDN services which would otherwise be displaced from these wire pairs, and at the same time providing ATM services to the subscriber. This helps prevent a disruptive and costly rewiring of an office building or home when ATM services are to be provided.

The present invention thus provides ATM services, and telephone voice service or basic rate ISDN service on the same unshielded pair wiring without using AAL-1 protocols, and without obsoleting existing equipment. It is also simple to install and low cost.

Briefly, the invention combines ISDN and telephone service with new ATM services by taking advantage of the timing characteristics of SONET/ATM links and using bytes that would be unallocated, in the pedestal to subscriber interface link, in the SONET protocol overhead bytes to carry the ISDN and telephone channels.

In accordance with an embodiment of the invention, a method of providing broadband communication services to a subscriber is comprised of receiving a TDM signal including ISDN data and a channel for at least one voice data signal, receiving ATM signals having a SONET protocol which is comprised of overhead data and payload data, inserting at least one of the ISDN data or voice data into the overhead data to provide a modified ATM signal, and transmitting the modified ATM signal to subscriber equipment over unshielded twisted pair wires.

In accordance with another embodiment, a method of providing broadband communication services to a subscriber is comprised of providing first broadband services from a central office via an ATM link to a neighborhood pedestal system, providing time division multiplex (TDM) services including voice communication services from the central office via a TDM link to the neighborhood pedestal system, providing a SONET-ATM communication link from the neighborhood pedestal system over two unshielded pair of twisted wires to a user-to-network interface (UNI) at a subscriber location, and providing ATM services over the SONET-ATM communication link and providing integrated services digital network (ISDN) or voice services within a SONET-ATM data frame using timing of the SONET-ATM communication link, to the UNI, whereby ATM, and ISDN or voice services are provided between the neighborhood pedestal system and the subscriber location over the unshielded wires.

In accordance with another embodiment, apparatus for providing broadband communication services to a subscriber is comprised of apparatus for receiving a TDM signal including ISDN data or at least one voice data signal, apparatus for receiving ATM signals having a SONET protocol comprised of overhead data and payload data, apparatus for inserting at least one of the ISDN data or voice data signal into the overhead data to provide a modified ATM signal, and apparatus for transmitting the modified ATM signal to subscriber equipment over unshielded twisted pair wires.

BRIEF INTRODUCTION TO THE DRAWINGS

Figure 2:
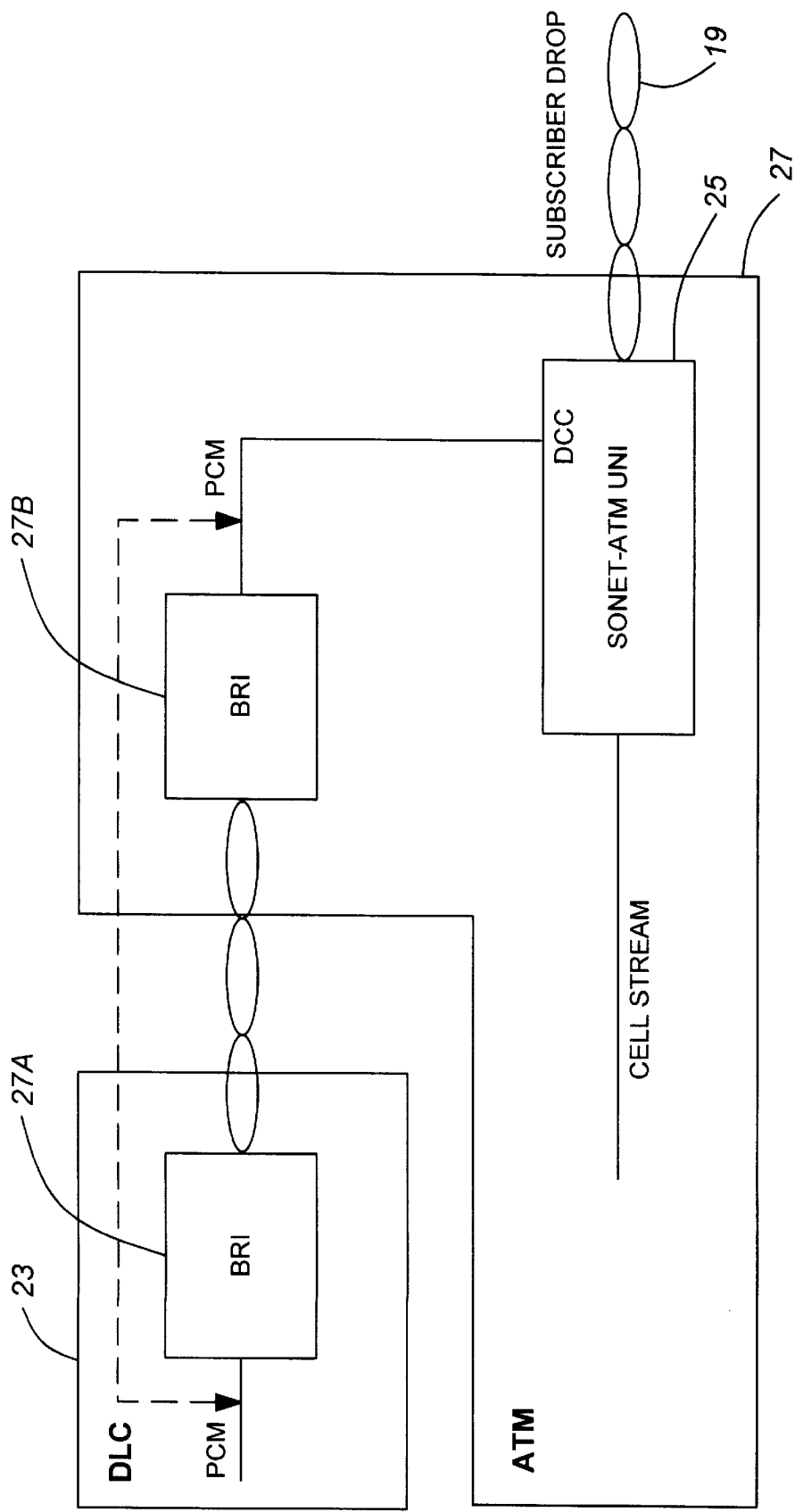
Figure 3:
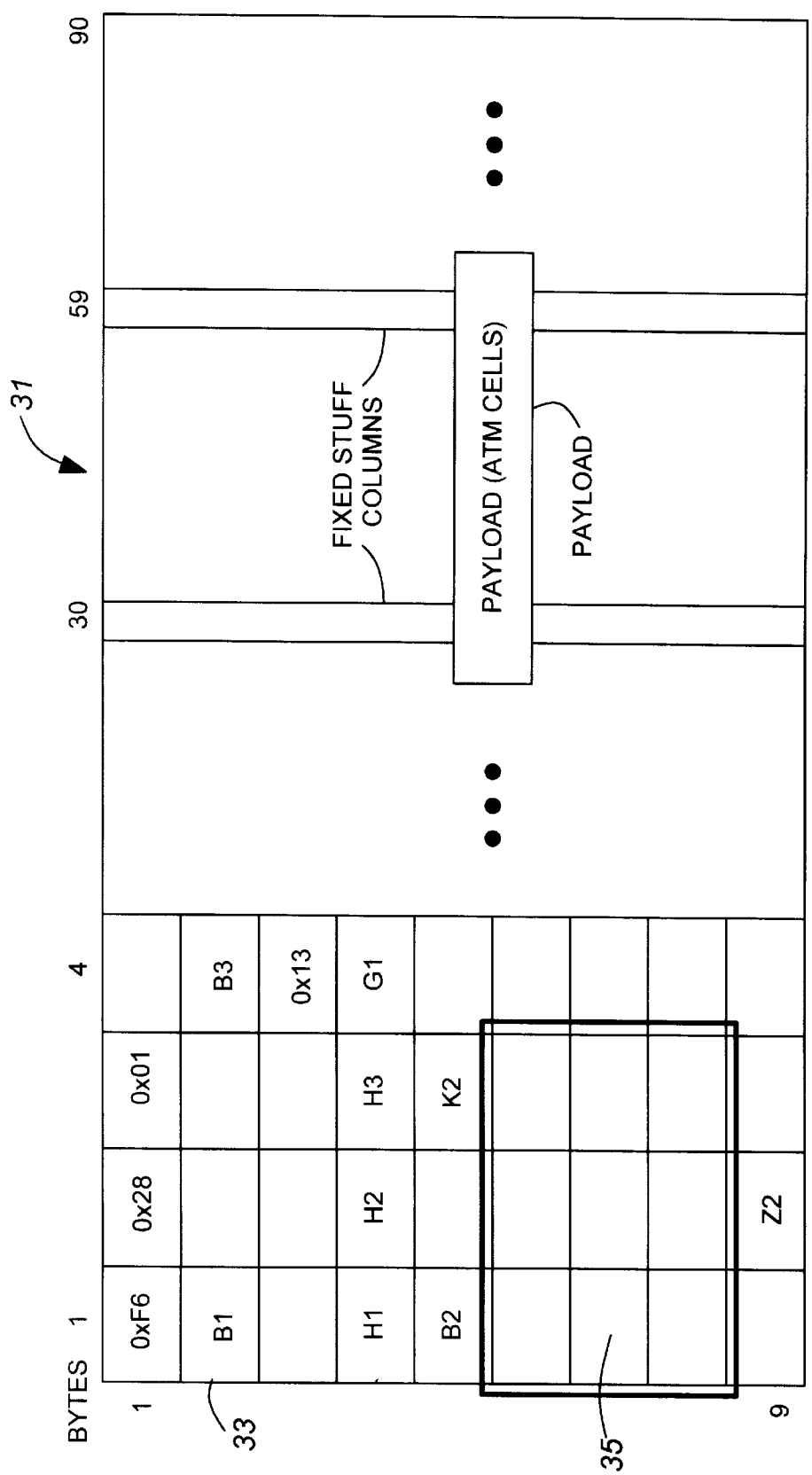
Figure 4A:
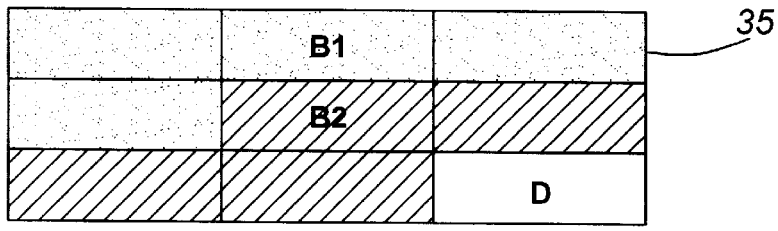
Figure 4B:
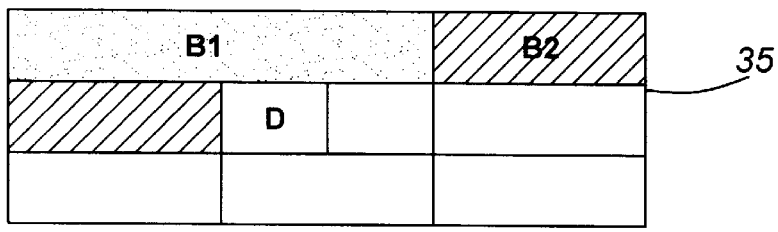
Figure 4C:
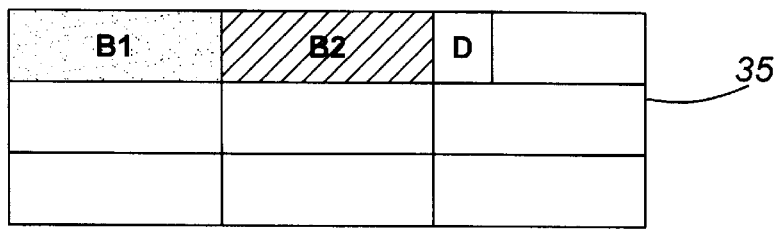
Figure 5:
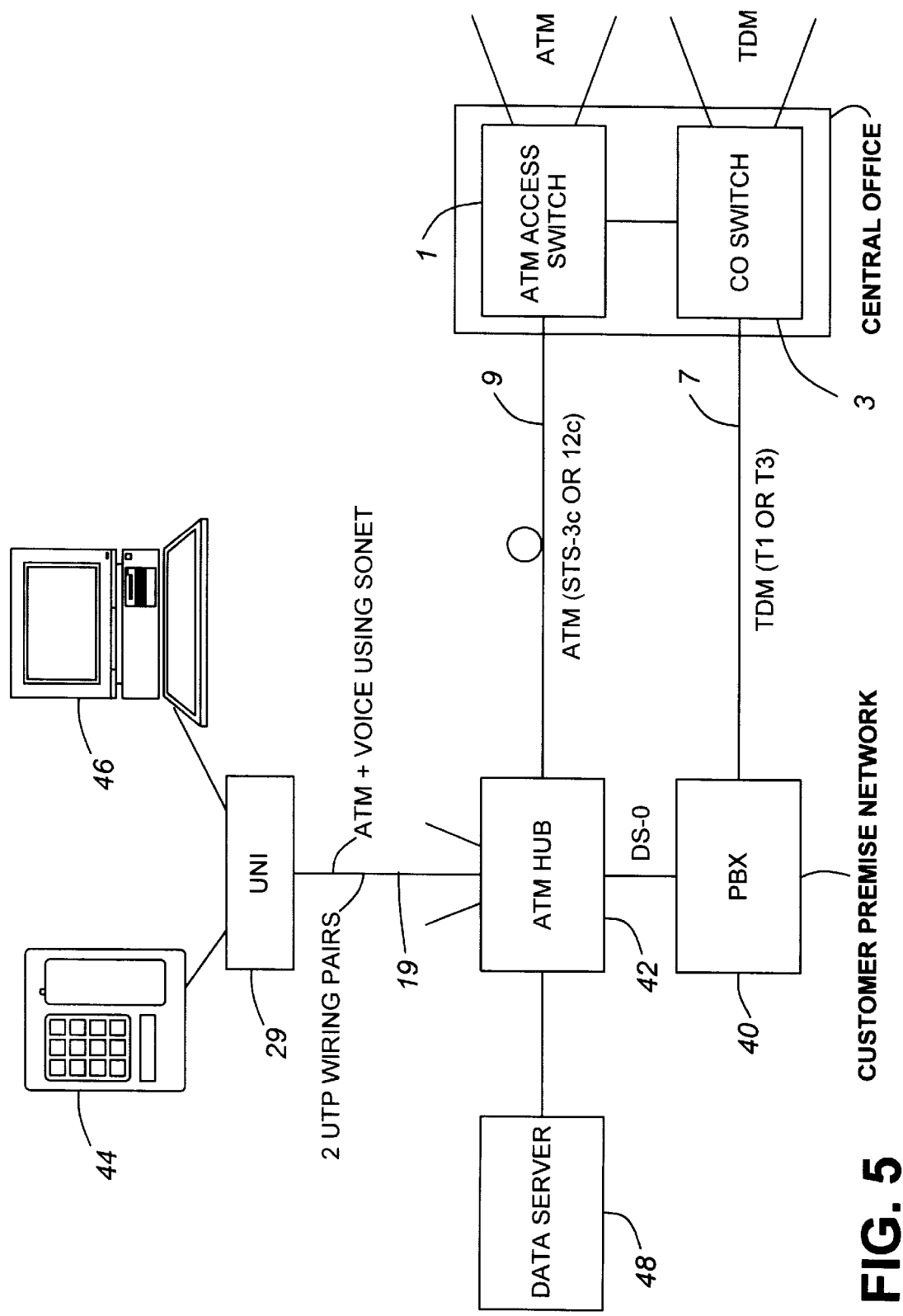

A better understanding of the invention will be obtained by reading the description of the invention below, with reference to the following drawings, in which:

FIG. 1 is a block diagram of a system in accordance with one embodiment of the invention, FIG. 2 is a block diagram of a pedestal subsystem for use in any of the embodiments of the invention, FIG. 3 is a representation of a SONET frame transmission scheme, FIGS. 4A, 4B and 4C are representations of bandwidth allocations for various bit rates, in overhead bytes of SONET frames, and FIG. 5 is a block diagram of a system in accordance with another embodiment of the invention.

DETAILED DESCRIPTION OF THE PREFERRED EMBODIMENT

With reference to FIG. 1, a central office 1 is comprised of a central office switch 3 and an asynchronous transfer mode (ATM) access switch 5. The central office provides time division multiplex (TDM) signals via a TDM feeder transmission path 7 in a well known manner. The TDM signals are comprised of integrated services digital network (ISDN) broadband data signals which can include digital voice signals, as will be described in more detail below. The ATM access switch provides a stream of ATM data cells on an ATM feeder transmission path 9 in a well known manner.

For residential services, the TDM feeder 7 is connected to a time division multiplexer/demultiplexer 11 contained in a headend 13, and the ATM feeder transmission path 9 is connected to an ATM switch 15 in the headend 13, in a well known manner. The headend typically services up to 500 homes with services such as video-on-demand, interactive games, data services and voice services, which can be contained in ISDN. The headend thus provides concentration.

The headend 15 is connected to pedestals 17 at plural neighborhood locations via TDM and ATM links 7A and 9A respectively. Each pedestal serves a small number of homes, e.g. six to twelve, and acts as a wiring hub, or traffic concentrator for broadband services. The pedestal, or the equivalent office structure, is sometimes referred to herein as a subscriber drop system.

Most telephone operating companies provide only two pair of unshielded twisted pair wires 19 into each home 21 from pedestal 17. Adding additional pairs into each home to provide for all of ISDN and ATM services would be prohibitively expensive. Use of ATM adaptation layer type 1 (AAAL-1) segmentation and reassembly processors is also very expensive.

In accordance with an embodiment of the present invention, the ISDN data or voice data signal (e.g. in pulse code modulated (PCM) format) from the TDM transmission path 7A is provided to a digital loop carrier subsystem 23, as shown in FIG. 2. Instead of the digital loop carrier being connected to the unshielded twisted pairs to the subscriber location as in the prior art case of provision of ISDN service, the digital loop carrier is connected to an ATM concentrator 25. The ATM concentrator receives a stream of ATM cells from the ATM transmission path 9A, and combines the ISDN data signal with the ATM data and applies the resulting combined signal as a modified ATM signal to the unshielded twisted pair 19 to the subscriber location. The digital loop carrier subsystem is thus used, and is not rendered obsolete.

As shown in FIG. 2, the digital loop carrier subsystem provides an ISDN signal to a basic rate interface (BRI) 27A, which is connected to a BRI 27B in the ATM concentrator 25. The BRI interfaces a DCC channel of a SONET ATM user network interface (UNI) subsystem of the ATM concentrator 17. The particular simple interface circuitry used depends on the particular design of the SONET ATM UNI and of the BRI; a description of a particular design herein would be redundant to a person skilled in the art understanding the present invention.

A shown in FIG. 1, the modified ATM signal is carried by the unshielded twisted pair to a corresponding UNI subsystem 29 inside the home of the subscriber, where the DCC is processed and provides another ISDN basic rate interface for the telephones and other ISDN devices, and processes ATM data streams for video and/or computers.

As shown in FIG. 2, it is also possible to bypass and not use the basic rate interfaces 27A and 27B in the digital loop carrier subsystem 23 and in the ATM concentrator 27, and have the time division multiplexed PCM data applied directly to the DCC input of the UNI 25 of the ATM concentrator 25.

The ATM data stream conforms to the SONET standard, which is a frame based data signal illustrated in FIG. 3. SONET defines a frame structure that can be represented by a row and column structure as shown. A frame 31 is comprised of 90 bytes, shown across the horizontal axis, comprised of an initial 4 bytes of overhead data 33 and 86 bytes of payload. The overhead data is comprised of 36 bytes, 4 successive bytes of which are transmitted each frame, which are shown along the vertical axis in matrix form.

For STS-1 bit rates (51.84 Mbit/s), the frame repeats every 125 microseconds (8 KHz). At lower bit rates (STS-½, STS-¼) this frame repeats at integer submultiples. At higher rates (STS-3c, STS-12c), the 8 KHz frame rate remains constant, but more bytes are interleaved into the frame.

The present invention utilizes several otherwise unassigned bytes 35 in the bandwidth of the SONET overhead for ISDN data signals, including PCM voice. This is possible because the SONET frame is repeated at an 8 KHz rate, and it is synchronized to the telephone network stratum reference clocks. These are the very functions that AAL-1 attempts to emulate, at high cost.

However, the SONET frame has been reused to carry ATM traffic in the payload. In the process, the payload has been totally reassigned, making it unsuitable for carrying voice traffic without first converting to ATM using the aforenoted AAL-1.

However in accordance with the present invention, at least 9 bytes of the SONET overhead is used to carry telephone voice and ISDN traffic in the ATM overhead, separate from the ATM payload. Since ISDN and telephone voice traffic requires an 8 KHz frame rate and stratum reference timing as is conveniently provided by SONET, the present invention is made possible.

Within a SONET network the 9 bytes 35 shown in FIG. 3 are normally used for data communications (DCC) so that various pieces of networking equipment can pass messages. At the user-to-network interface (UNI), however, these bytes are undefined and the present invention uses them instead to carry the ISDN and telephone voice (PCM) traffic.

Standards have been defined for several SONET based rates for the basic physical layer interconnect (interface). The definition provides 144 kilobits per second of bandwidth in unused bytes even at the slowest speed of 12.96 Mbit/s. This is exactly the bandwidth required to support either a basic rate ISDN link, or two traditional telephone channels with signaling. The present invention utilizes the 144 kilobits (or more) per second bandwidth into the home or to the desktop for the provisioning of ISDN or telephone service.

The following table illustrates the correspondence between the link bit rate, the STS, STM, the data channel DCC bandwidth and the allocation for ISDN or telephone service of the data channel capacity utilized by the present invention.

| Link Bit Rate (Mbits/s) | STS | STM | DCC bandwidth (kbits/s) | ISDN/POTS bandwidth (kbits/s) |
|---|---|---|---|---|
| 12.96 | 1/4 | — | 144 | 144* |
| 25.92 | 1/2 | — | 288 | 144 |
| 51.84 | 1 | 0 | 576 | 144 |
| 155.52 | 3C | 1 | 576 | 144 |
| 622.08 | 12C | 4 | 576 | 144 |

*144 kbit/s = 2*64 + 16 kbit/s = ISDN BRI or two voice channels plus signaling.

FIGS. 4A, 4B and 4C illustrate the 9 bytes of ATM frame overhead, as recommended allocation for STS-¼ (12.96 Mbit/s), STS-½ (25.92 Mbit/s) and STS-1, 3C, 12 (51.84, 155.52, 622.08 Mbit/s) respectively. FIG. 4A shows 4 bytes used for channel B1, 4 bytes used for channel B2 and 1 byte D for data. FIG. 4B shows 2 bytes used for channel B1, 2 bytes used for channel B2 and ½ byte D for data. FIG. 4C shows 1 bytes used for channel B1, 1 bytes used for channel B2 and ¼ byte D for data. The 64 kilobit per second B1 and B2 channels are two basic rate ISDN bearer channels, or two telephone voice (PCM) channels, and the 16 kilobit per second D channel is used for signaling (LAPD for ISDN, 2 level for telephone).

FIG. 5 illustrates the invention used in an office environment. The central office switch and ATM access switch connect via TDM and ATM transmission paths 7 and 9 respectively to a PBX 40 and an ATM hub 42 in a similar manner as in the embodiment of FIG. 1, wherein the PBX contains a digital carrier termination corresponding to the digital loop carrier 17 in FIG. 1, and the ATM hub contains a SONET-ATM UNI similar to the ATM concentrator 25 of FIG. 1.

In this embodiment, the existing PBX is disconnected from the office wiring, and is connected into the ATM hub 42 which provides ISDN and telephone service as well as ATM service to desktops over the same twisted pair wiring formerly used by the PBX. An UNI 29 is located at each desktop, which provides the ISDN and normal telephone service to a telephone 44, and the ATM traffic is provided to a computer 46 central processor unit. Data from a data server 48 can be routed to the computer or to the telephones via a DCC input to the ATM hub 42.

A person understanding this invention may now conceive of alternative structures and embodiments or variations of the above. All of those which fall within the scope of the claims appended hereto are considered to be part of the present invention.

I claim:

1. A method of providing broadband communication services to a subscriber comprising:

(a) providing first broadband services from a central office via an ATM link to a neighborhood pedestal system, (b) providing time division multiplex (TDM services including voice communication services from said central office via a TDM link to said neighborhood pedestal system, (c) providing a SONET-ATM communication link from said neighborhood pedestal system over two unshielded pair of twisted wires to a user-to-network interface UNI) at a subscriber locations, and (d) providing ATM services over said SONET-ATM communication link and providing integrated services digital network (ISDN) or voice services within a SONET-ATM data frame using timing of said SONET-ATM communication link, to the UNI, whereby ATM ISDM and voice services are provided between said neighborhood pedestal system and said subscriber location over said unshielded wires, said SONET-ATM data frame being comprised of a repeating frame structure comprised of overhead data and payload data, said method including providing said ISDN or voice services within the overhead data and ATM services within the payload data.

2. A method as defined in claim 1 including separating ATM from the ISDN and voice communication traffic at the UNI and distributing it to user station apparatus at a subscriber location.

3. A method as defined in claim 1 including receiving TDM signals by a digital loop carrier system in said neighborhood pedestal system, receiving ATM signals by an ATM concentrator system in said neighborhood pedestal system, supplying ISDN or voice signals from the digital loop carrier system to the ATM concentrator and adding at least one of said ISDN and voice signals to said overhead data.

4. A method as defined in claim 3 including multiplexing-demultiplexing said first broadband services at a headend connected between a switch at said central office and digital loop carrier systems contained in plural ones of said neighborhood pedestal systems, and multiplexing-demultiplexing said TDM services at an ATM switch at said headend connected between an ATM access switch at said central office and ATM concentrator systems contained in plural ones of said neighborhood pedestal systems.

5. A method as defined in claim 1 in which said neighborhood pedestal system is a customer premise network comprised of an ATM hub and a PBX, said method including receiving ATM data in the ATM hub, receiving said TDM data in said PBX providing ISDN and voice signals from the PBX to the ATM hub, inserting at least one of the ISDN or voice signals into the overhead data in the ATM hub, distributing ATM data via said UNI to a computer from the ATM hub and distributing at least one of ISDN or voice signals to a telephone from the ATM hub.

* * * * *

UNITED STATES PATENT AND TRADEMARK OFFICE
CERTIFICATE OF CORRECTION

PATENT NO. : 6,292,486 B1
DATED : September 18, 2001
INVENTOR(S) : Vernon Robert Little It is certified that error appears in the above-identified patent and that said Letters Patent is hereby corrected as shown below:

Column 3,
Line 11, change " (AAAL-1) " to read -- (AAL-1) --

Signed and Sealed this

Sixteenth Day of July, 2002

Attest:

JAMES E. ROGAN
Attesting Officer   Director of the United States Patent and Trademark Office